May 22, 1962     C. B. GRADY, JR     3,036,261
BATTERY CHARGING REGULATOR
Filed Oct. 31, 1960
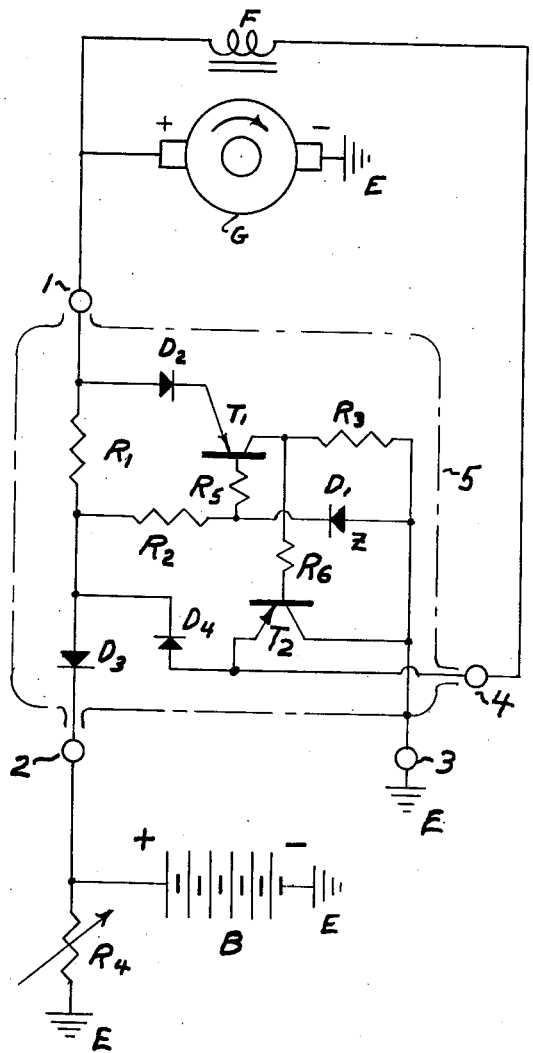
INVENTOR.

United States Patent Office 3,036,261
Patented May 22, 1962

3,036,261
BATTERY CHARGING REGULATOR
Charles B. Grady, Jr., 1 Ridgeway Ave., West Orange, N.J.
Filed Oct. 31, 1960, Ser. No. 66,030
4 Claims. (Cl. 323—22)

This invention relates to an electrical regulator using only solid state components for charging a storage battery from a direct current generator under the conditions of highly variable generator speed and highly variable battery load which are characteristic of automotive electrical supply systems.

In the traditional automotive regulator art it is required that three boundary conditions be met, namely: first, generator output must be diminished when the voltage appearing across the battery exceeds a predetermined limit; second, generator output must be diminished when the charging current to the battery exceeds a predetermined amount corresponding to the maximum capacity of the generator; and third, the battery must be blocked from supplying energy to the generator. These three independent conditions are usually met by there relay type devices designed to modulate the exciting field current of the commutator type D.C. generator by oscillatorily disabling the excitation of the generator by relay contact openings or by interrupting the battery generator communication by a relay cutout device responsive to reverse-flowing currents.

The present invention accomplishes these three boundary requirements by a novel interacting network of semiconductor and other solid state devices having no moving parts.

In accordance with my invention, the first boundary condition of voltage regulation, is accomplished by utilizing the properties of a zener diode to produce a control voltage which is amplified by a transistor and used to control the generator excitation current downwardly until the charging voltage is equal to the zener reference voltage.

In my device the second boundary condition of charging current regulation is sensed by passing the charging current through a very low valued resistor so as to produce a small voltage drop proportional to the charging current. My circuit then utilizes the forward breakdown voltage characteristic of a semiconductor diode to oppose the foregoing charging current sensing voltage in such a way that the excess of sensing voltage over diode forward breakdown voltage is applied to the base of the same transistor used to amplify the zener voltage regulating signal. In this way, one servo control amplifier is made to respond simultaneously and independently to two input error signals relating to the voltage and current of a single generator output.

The third boundary condition of current reversal is met in my regulator network by the use of a diode of large current capacity inserted in the battery charging lead in series with the current sensing resistor.

One object of my invention is to provide a reliable solid state automotive regulator which can interchangeably replace a conventional relay type regulator.

A second object is to provide a four terminal control device for direct current generators in which the reverse breakdown voltage of a first diode is used as a reference with respect to which the generator voltage is made to modulate the generator field excitation, in which the forward breakdown voltage of a second diode is used as a reference with respect to which the generator current is made to modulate the generator field excitation independently of the first voltage responsive modulation, and in which the polarity of a third diode is used as a reference with respect to which the direction of current flow from the generator is made to be unidirectional.

A third object is to provide a four terminal circuit composed of solid state components in which either the increase above a first predetermined value of the current flowing between the first and second terminals, or the increase of the voltage above a second predetermined value between the second and third terminals, will decrease the current flowing between the third and fourth terminals thereof.

Other objects are implicit in the accompanying specifications and claims.

Referring to FIG. 1 which is the schematic diagram of the preferred embodiment of my invention, it may be seen that the negative output terminal of the commutator type direct current generator G is grounded at E, and that the positive output terminal is connected at the generator to one side of the field excitation winding F, and also to terminal 1 of the regulator case 5. The remaining lead of the generator field excitation winding F is connected to terminal 4 of the regulator 5.

The storage battery B has its negative terminal grounded at E and its positive terminal connected to the variable automotive load $R_4$ and to the regulator terminal 2. Terminal 3 of the regulator is grounded at E, and is also connected to the regulator case 5.

Charging current flowing from the generator G to the battery B passes from terminal 1 through the current sensing resistor $R_1$ and through the heavy duty diode $D_3$ to the battery B via terminal 2. $D_3$ serves as a cut-out to prevent battery current from draining into the generator.

The voltage impressed by or on the battery B appears across terminals 2 and 3, and consequently, is impressed on the series circuit path $D_1$, $R_2$. The diode $D_1$ is a zener reference diode which is chosen to have a characteristic reverse breakdown voltage slightly in excess of the normal battery voltage. Thus, for a 12.6 volt battery the diode $D_1$ might be chosen to have a zener value of 13.0 volts.

When the generator attempts to raise the voltage between terminals 1 and 3 higher than this zener reference, current will flow through $R_2$ thereby making the base of servo amplifying PNP transistor $T_1$ more negative. This will cause $T_1$ to conduct and increase the current flow in load resistor $R_3$ thereby forcing the base of the PNP emitter-follower power transistor $T_2$ to a more positive potential. This, in turn, will tend to reduce the current flowing through $T_2$ and the generator exciting field winding F, which is maximum when $T_1$ is not conducting. In this manner, the portion of the circuit of FIG. 1 which has been described, regulates the output voltage of the generator so as not to exceed the zener reference voltage of $D_1$.

In a 12.6 volt 30 ampere system the value of $R_1$ would be chosen to be on the order of 0.02 ohm. Under these circumstances the voltage drop across $R_1$ at 30 amperes would be 0.6 volt (18 watts) which, except for the presence of current reference diode $D_2$ would tend to make the base of servo transistor $T_1$ less positive with respect to its emitter and therefore to increase its conductivity which in turn would start to reduce the generator excitation. However, the reference diode $D_2$ is chosen to have a forward breakdown voltage of, in this case, 0.6 volt, so that control transistor $T_1$ will not start conducting in response to current sensing voltages until the drop across $R_1$ exceeds 0.6 volt corresponding to the 30 ampere limit selected by the choice of $D_2$ and $R_1$.

Diode $D_4$ is included as a safety means to suppress any inductive surges from the field winding F.

Due to the fact that $R_2$ is very large with respect to $R_1$, for example, 5000 times $R_1$, or 100 ohms, this circuit has made the current control error voltage to be independent of the voltage control error current, and vice versa. In this way, the control transistor $T_1$ has been made to be independently responsive to two different control criteria.

The resistors $R_5$ and $R_6$ are current limiting resistors for $T_1$ and $T_2$ respectively.

It is to be noted that the forward breakdown voltage of $D_2$ has the effect of opposing the zener reverse breakdown voltage, so that the choice of the zener value should be made smaller than the desired control margin by the amount of the $D_2$ forward breakdown voltage.

As many changes could be made in the above battery charging regulator, and many widely different embodiments in this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a battery charging regulator the combination comprising a first terminal, a second terminal, a third terminal, a fourth terminal, a first circuit including a first resistor, a first diode in first series circuit relation with said first resistor, said first circuit extending between said first and second terminals, a first transistor, a second diode, a second resistor in second series circuit relation with said second diode, said second circuit extending between said third terminal and said first series circuit, the base of said first transistor being connected by a third circuit means to the junction between said second diode and said second resistor, a third resistor connected between the collector of said first transistor and said third terminal, a third diode connected between said first circuit and the emitter of said first transistor, a second transistor having fourth circuit means extending between its base and the collector of said first transistor, fifth circuit means connecting said third terminal to the collector of said second transistor, and sixth circuit means extending between said fourth terminal and the emitter of said second transistor.

2. In a regulator according to claim 1 the ratio of said second resistor to said first resistor being in excess of one thousand.

3. In a regulator according to claim 1 the forward breakdown voltage of said third diode being less than $\frac{1}{10}$ of the forward breakdown voltage of said second diode.

4. In a regulator according to claim 1, a fourth diode, and seventh circuit means connecting it in parallel relation to terminals one and four.

References Cited in the file of this patent

UNITED STATES PATENTS

| | | |
|---|---|---|
| 2,892,143 | Sommer | June 23, 1959 |
| 2,980,843 | Conger et al. | Apr. 18, 1961 |